US00RE50121E

(19) United States
(12) Reissued Patent
Olofsson et al.

(10) Patent Number: US RE50,121 E
(45) Date of Reissued Patent: Sep. 10, 2024

(54) SERVICE CHAINING BASED ON LABELS IN CONTROL AND FORWARDING

(71) Applicant: Cisco Technology, Inc., San Jose, CA (US)

(72) Inventors: Lars Olof Stefan Olofsson, Dubai (AE); Atif Khan, San Jose, CA (US); Syed Khalid Raza, Fremont, CA (US); Himanshu H. Shah, Milpitas, CA (US); Amir Khan, San Jose, CA (US); Nehal Bhau, San Jose, CA (US)

(73) Assignee: Cisco Technology, Inc., San Jose, CA (US)

(21) Appl. No.: 17/104,933

(22) Filed: Nov. 25, 2020

Related U.S. Patent Documents

Reissue of:
(64) Patent No.: 10,142,254
Issued: Nov. 27, 2018
Appl. No.: 14/028,514
Filed: Sep. 16, 2013

(51) Int. Cl.
*H04L 12/28* (2006.01)
*H04L 12/911* (2013.01)
(Continued)

(52) U.S. Cl.
CPC ..... *H04L 47/70* (2013.01); *H04L 45/64* (2013.01)

(58) Field of Classification Search
None
See application file for complete search history.

(56) References Cited

U.S. PATENT DOCUMENTS 6,044,396 A 3/2000 Adams
6,289,419 B1 9/2001 Takahashi
(Continued)

FOREIGN PATENT DOCUMENTS

CN 1254059 C 4/2006
WO 2013007496 A1 1/2013
WO 2015092491 A1 6/2015

OTHER PUBLICATIONS

Lara et al., "Network Innovation using OpenFlow: A Survey," CSE Jounral Articles, Dept. of Computer Science and Engineering, 2014, pp. 1-21.

(Continued)

*Primary Examiner* — Robert L Nasser
(74) *Attorney, Agent, or Firm* — Polsinelli P.C.

(57) ABSTRACT

A method for routing is disclosed. The method comprises establishing an overlay network, comprising a plurality of network elements and an overlay controller; wherein the overlay controller is in communication with each network element via a secure tunnel established through an underlying transport network; receiving by the overlay controller, information from each service-hosting network element information said information identifying a service hosted at that service-hosting network element, and label associated with the service-hosting network element; identifying by the overlay controller, at least one policy that associates traffic from a site with a service; and causing by said overly controller, the at least one policy to be executed so that traffic from the site identified in the policy is routed using the underlying transport network to the service-hosting network element associated with the said service.

45 Claims, 7 Drawing Sheets

(51) Int. Cl.
*H04L 45/64* (2022.01)
*H04L 47/70* (2022.01)

(56) References Cited

U.S. PATENT DOCUMENTS 6,535,607 B1 3/2003 Chandersekaran et al.
6,594,361 B1 7/2003 Chaney et al.
6,611,872 B1 8/2003 McCanne
6,675,225 B1 1/2004 Genty et al.
7,117,530 B1 10/2006 Lin
7,120,682 B1 10/2006 Salama
7,251,824 B2 7/2007 Edwards et al.
7,925,592 B1 4/2011 Issa et al.
7,995,573 B2 8/2011 Danzeisen et al.
8,023,504 B2 * 9/2011 Shah ..... H04L 45/00 370/389
8,041,039 B2 10/2011 Tajima et al.
8,224,971 B1 7/2012 Miller et al.
8,515,079 B1 8/2013 Asati et al.
8,516,552 B2 8/2013 Raleigh
8,594,323 B2 11/2013 Dondeti
8,868,698 B2 10/2014 Millington et al.
8,879,739 B2 11/2014 Bieber
8,954,740 B1 2/2015 Moscaritolo et al.
8,959,333 B2 2/2015 Falk et al.
9,467,478 B1 10/2016 Khan et al.
9,659,170 B2 5/2017 Chapman, III
9,736,113 B1 8/2017 Khan et al.
9,980,303 B2 5/2018 Shanks et al.
10,277,558 B2 4/2019 Khan et al.
10,298,672 B2 5/2019 Shanks et al.
10,917,926 B2 2/2021 Shanks et al.
2003/0140142 A1 7/2003 Marples et al.
2004/0034702 A1 2/2004 He
2004/0088369 A1 5/2004 Yeager et al.
2004/0103205 A1 5/2004 Larson et al.
2004/0184603 A1 9/2004 Pearson et al.
2004/0203590 A1 10/2004 Shteyn
2005/0021610 A1 1/2005 Bozionek et al.
2005/0044356 A1 2/2005 Srivastava et al.
2005/0071280 A1 3/2005 Irwin et al.
2005/0094814 A1 5/2005 Aihara
2006/0015643 A1 1/2006 Orava et al.
2006/0088031 A1 4/2006 Nalawade
2006/0155721 A1 7/2006 Grunwald et al.
2006/0165233 A1 7/2006 Nonaka et al.
2006/0221830 A1 10/2006 Hu
2006/0233180 A1 10/2006 Serghi et al.
2006/0288209 A1 12/2006 Vogler
2007/0086431 A1 4/2007 Abu-Amara
2007/0104115 A1 * 5/2007 Decasper ..... H04L 12/4641 370/254
2007/0118885 A1 5/2007 Elrod
2007/0140110 A1 6/2007 Kaler
2007/0153782 A1 7/2007 Fletcher et al.
2007/0185814 A1 8/2007 Boccon-Gibod et al.
2007/0230688 A1 10/2007 Tajima et al.
2007/0248232 A1 10/2007 Driscoll et al.
2007/0299954 A1 12/2007 Fatula
2008/0013738 A1 1/2008 Tajima et al.
2008/0080716 A1 4/2008 McAlister et al.
2008/0130902 A1 6/2008 Foo Kune et al.
2008/0147820 A1 6/2008 Maeda et al.
2008/0273704 A1 11/2008 Norrman et al.
2009/0193253 A1 7/2009 Falk et al.
2009/0216910 A1 8/2009 Duchesneau
2009/0220080 A1 8/2009 Herne et al.
2009/0296924 A1 12/2009 Oksman et al.
2010/0014677 A1 1/2010 Sato et al.
2010/0058082 A1 3/2010 Locker et al.
2010/0064008 A1 3/2010 Yan et al.
2010/0122084 A1 5/2010 Liu
2010/0169563 A1 7/2010 Horner
2010/0281251 A1 11/2010 Arauz Rosado
2010/0325423 A1 12/2010 Etchegoyen
2011/0010553 A1 1/2011 Cahn
2011/0110377 A1 2/2011 Alkhatib et al.
2011/0064222 A1 3/2011 Wiseman
2011/0075674 A1 3/2011 Li et al.
2011/0164750 A1 7/2011 Maas et al.
2011/0296510 A1 12/2011 Hatlelid et al.
2012/0051221 A1 3/2012 Bui et al.
2012/0092986 A1 4/2012 Chen
2012/0134361 A1 * 5/2012 Wong ..... H04L 45/021 370/392
2012/0180122 A1 7/2012 Yan et al.
2012/0266209 A1 10/2012 Gooding et al.
2012/0284370 A1 11/2012 Hierro
2013/0034094 A1 2/2013 Cardona et al.
2013/0051559 A1 2/2013 Baba
2013/0121142 A1 * 5/2013 Bai ..... H04L 12/1868 370/228
2013/0163446 A1 6/2013 Kruger et al.
2013/0182712 A1 7/2013 Aguayo et al.
2013/0201909 A1 8/2013 Bosch et al.
2013/0223444 A1 8/2013 Liljenstolpe et al.
2013/0251154 A1 9/2013 Tanizawa et al.
2013/0266007 A1 10/2013 Kumbhare et al.
2013/0306276 A1 11/2013 Duchesneau
2013/0329725 A1 12/2013 Nakil et al.
2013/0335582 A1 12/2013 Itasaki et al.
2014/0003425 A1 * 1/2014 Zhao ..... H04L 12/1836 370/390
2014/0079059 A1 3/2014 Amir et al.
2014/0153457 A1 6/2014 Liu
2014/0153572 A1 6/2014 Hampel et al.
2014/0189363 A1 7/2014 Thomas et al.
2014/0223520 A1 8/2014 Gafni
2014/0294018 A1 10/2014 Sung et al.
2014/0297438 A1 10/2014 Dua
2014/0331050 A1 11/2014 Armstrong et al.
2014/0380039 A1 12/2014 Larson et al.
2015/0006737 A1 1/2015 Chen et al.
2015/0033298 A1 1/2015 Martini
2015/0092603 A1 4/2015 Aguayo et al.
2015/0103839 A1 4/2015 Chandrashekhar et al.
2015/0106620 A1 4/2015 Cabrera et al.
2015/0127797 A1 5/2015 Attar et al.
2015/0229490 A1 8/2015 Brandstätter
2015/0256521 A1 9/2015 Cummings et al.
2016/0036785 A1 2/2016 Ambroz et al.
2016/0080268 A1 3/2016 Anand et al.
2016/0226762 A1 8/2016 Zhang et al.
2017/0076291 A1 3/2017 Cairns et al.
2017/0155628 A1 6/2017 Rohloff et al.
2017/0223154 A1 8/2017 Hammam et al.
2018/0054438 A1 2/2018 Li et al.
2018/0091417 A1 3/2018 Oréet al.

OTHER PUBLICATIONS

"Aruba Central Support Page", Hewlett Packard Enterprise Development, 2021, 2 pages, https://help.central.arubanetworks.com/latest/documentation/online_help/content/gateways/cfg/overlay-orchestration/tunnel-orchestration.htm.

"Aruba Central Support Page: Advertising Overlay Routes", Hewlett Packard Enterprise Development, 2021, 8 pages, https://help.central.arubanetworks.com/latest/documentation/online_help/content/gateways/cfg/routing/overlay_routing.htm.

"Aruba SD-WAN Solution, User Guide", Hewlett Packard Enterprise Company, 2019, 316 pages.

"FAQ: Vormetric Key Management Key Vault", Version 5.2, May 14, 2012, 5 pages.

"FAQ: Vormetric Key Management—Key Agent for Oracle Transparent Data Encryption", Version 7.2, Jul. 2, 2012, 8 pages, Vormetric.com.

"Ipsec UDP Mode in Silver Peak Unity EdgeConnect", Silver Peak, Whitepaper, 12 pages, https://www.silver-peak.com/sites/default/files/userdocs/silver-peak-whitepaper-ipsec-udp-1018_1.pdf.

* cited by examiner

SERVICE CHAINING BASED ON LABELS IN CONTROL AND FORWARDING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

Embodiments of the present invention relate to networking.

BACKGROUND

Enterprises and Service Providers (SPs) have a common requirement to pass data traffic through certain locations or along certain paths.

Existing solutions have the ability to pass traffic through a single location or to tie traffic to a specific path by determining a specific hop-by-hop forwarding path. However, if any service along the path experiences a disruption, then the only remedy is to rely on routing protocols that inherently lack awareness of service locations.

SUMMARY

In one aspect there is provided a network system comprising a plurality of service locations, wherein each service location is equipped to make independent forwarding decisions based on policy and wherein a service can be provided in a redundant fashion making the infrastructure aware of where a service is located and how it can be backed up.

In a second aspect there is provided a mechanism to allow for several different services to be tied together in a chain.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a service chain construct that may be used to facilitate routing within a network based on service availability within the network.

Figure 1:
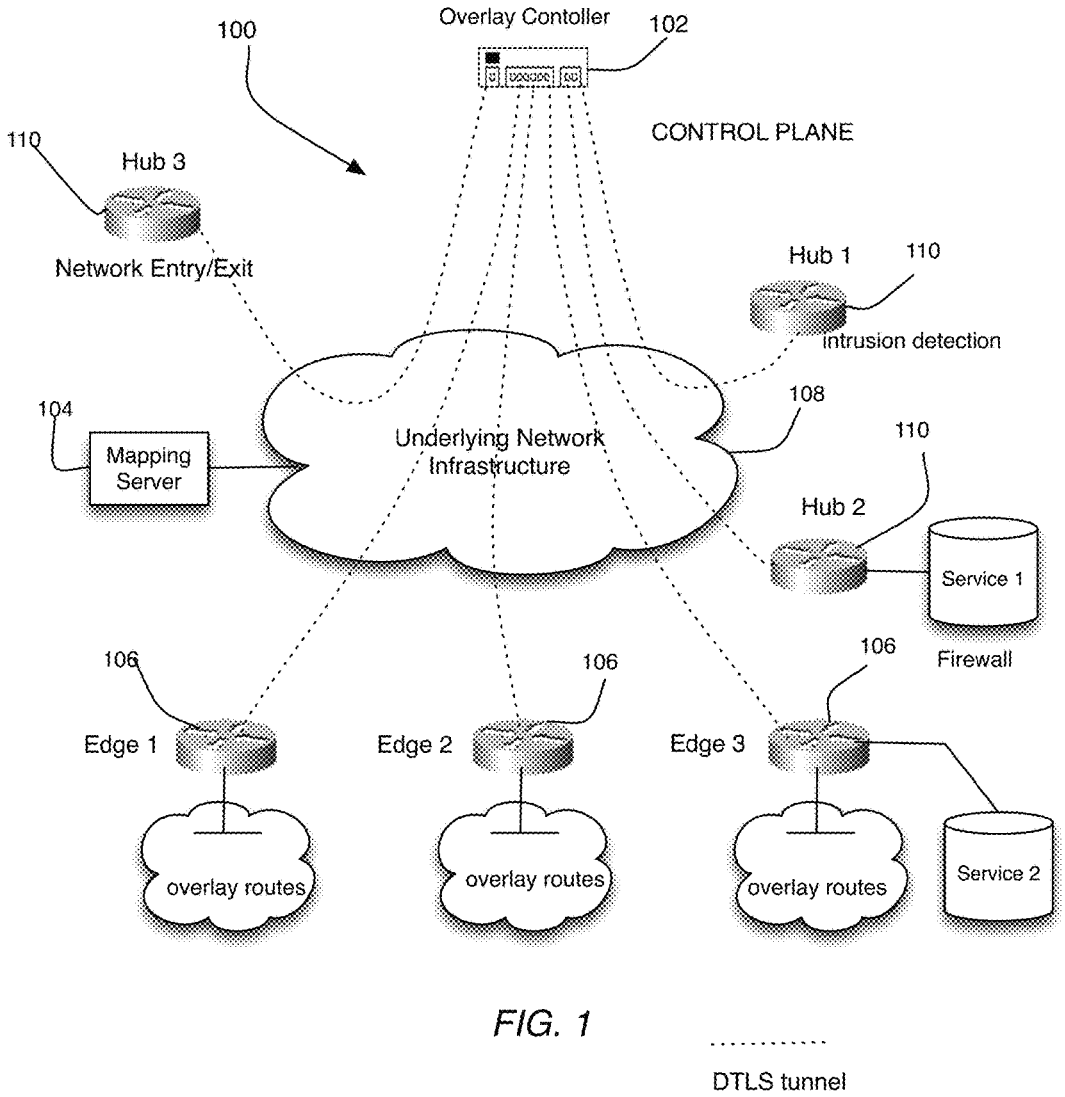
FIG. 1 shows and architecture for achieving service chaining, with emphasis on a control plane, in accordance with one embodiment of the invention.

In one embodiment, to realize the service chain construct, network elements may be interconnected across a regular network infrastructure in order to provide an overlay network on top of the regular network infrastructure. FIG. 1 shows an embodiment 100 of the overlay network. Referring to FIG. 1, the overlay network 100 includes an overlay controller 102, a mapping server 104, and a plurality of overlay edge routers 106. The overlay controller 102 is configured to orchestrate the overlay network 100 using a secure transport (TLS, Transport Layer Security, IETF RFC5246) and a designated overlay control plane protocol over underlying network infrastructure 108. In one embodiment, the network infrastructure 108 may include a public network such as the Internet. The overlay control plane protocol may operate in a similar fashion to BGP (IETF RFC4271), in functions related to route and policy distribution, reliable transport over TCP (IETF RFC793), and optimal path selection process and distributed state creation.

In one embodiment, in order for the overlay control plane protocol to provide a functional architecture, it distributes overlay routes that are learned from each location where an overlay network element is present, together with external addresses used as next-hop addresses for the overlay routes. The external addresses may be assigned to the physical interfaces of the overlay network elements that attach to the underlying network 108. In one embodiment, the overlay routes may only be accessed through the overlay network 100 and the next-hop addresses can only be reached through the underlying network 108. Together, the overlay routes and next-hop addresses provide for a complete and functional overlay architecture, as will be explained. As far as the underlying network 108 is concerned, the only element used to forward traffic between the sites is the next-hop address. The underlying network 108 does not know about any other routes, addresses or labels that may be used for providing a functional network infrastructure within the overlay network 100 itself.

Secure tunnels are established between the next-hop addresses, which define the elements (hubs or edges) that actually instantiate the overlay network 100. The secure tunnels define a control plane, as shown in FIG. 1 Thus, all traffic that use the overlay network 100 for transport is carried within this topology of tunnels.

Figure 2:
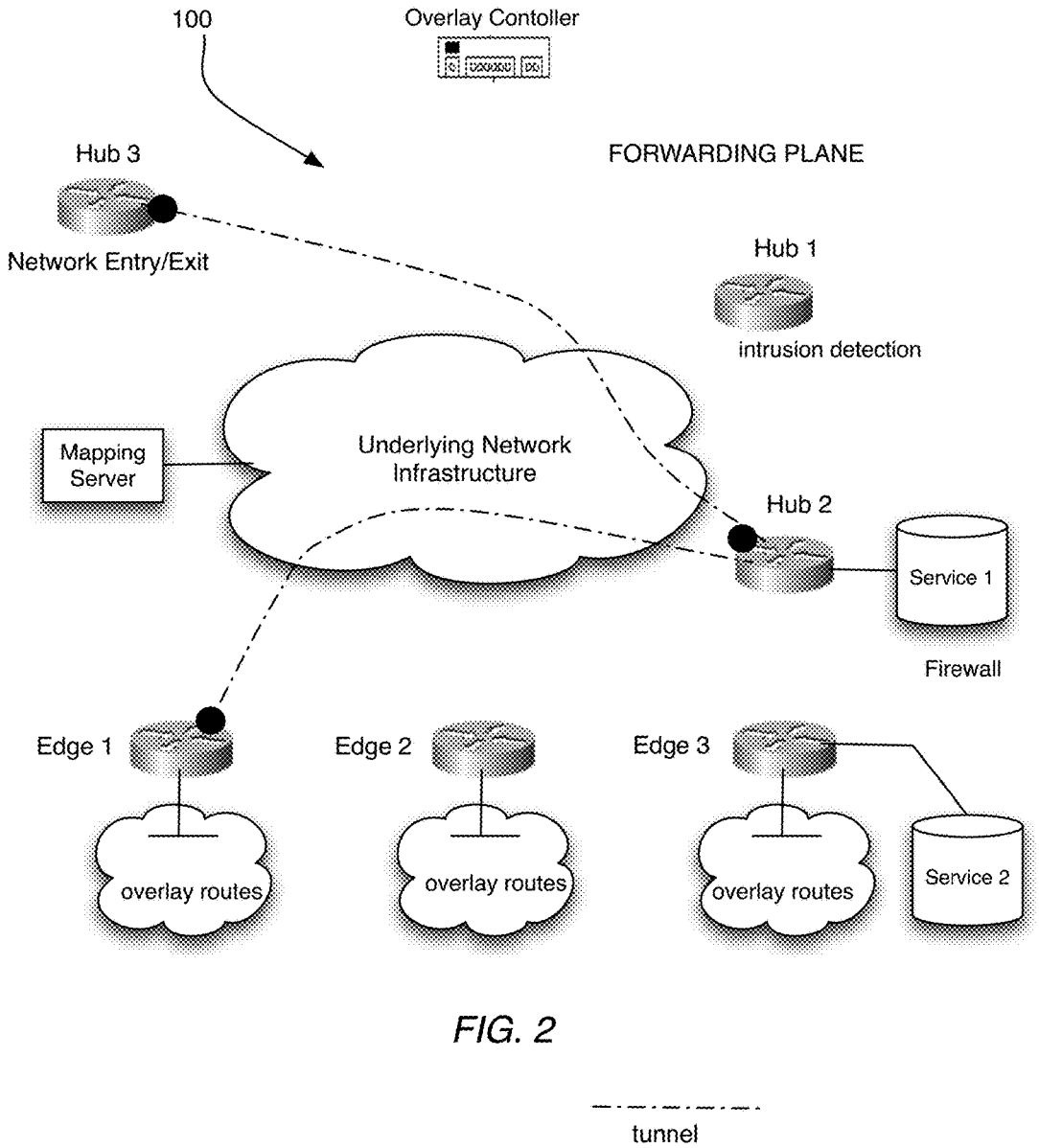
FIG. 2 shows and architecture for achieving service chaining, with emphasis on a forwarding plane, in accordance with one embodiment of the invention.

In one embodiment, within the overlay network 100, the overlay controller 102 processes control plane traffic, but does not get involved in the processing of data traffic. All data traffic is processed by the network elements present at site locations, such as a branch office, or central locations, such as a data center or a headquarters location. These network elements if, at a branch location is referred to as an "edge" and if, at a central location, is referred to as a "hub". In FIG. 1 hubs are indicated by reference numeral 110, whereas edges are indicated by reference numeral 106. In one embodiment, secure peer-to-peer links between the hubs and services define a forwarding plane, as shown in FIG. 2.

Providing Services

In general, services within a network may be provided at two or more layers. However, the most common layers are User services or Applications, and Network services or Applications. The differentiator between the two is that users will actively interact with user services, such as those provided through a web-browser, where network services are applied to network traffic in a way that is, or at least should be, transparent to the user.

Providing applications for user consumption requires the network to carry traffic from the user endpoint to the service endpoint and back. Providing network services requires a direct interaction between the network elements closest to the user, the network elements closest to the service, and traditionally, all the network elements in between. Even with this simplification that removes dependency on the intermediate network, there are still challenges in providing network level services that can be delivered in a way that is transparent to the user. These challenges include:

Chaining multiple services together, either in the same or in different locations of the network;

Overloading an existing control plane protocol with service information in a way that it was not designed to handle;

Minimizing the rerouting and shuffling of network traffic such that it only has to touch the sites where the services required for a given type of traffic are located;

Providing different services or chains of services depending on the direction of traffic; Requirements may be different depending on whether the traffic is originating from user location or is destined for a user location Offering different services depending on which virtual domain a given user may be a part of;

Providing traffic load distribution across multiple different locations that are providing different instances of the same service;

Distributing awareness across the network of which services are available and where the are located;

Providing Services in the Overlay Network 100

An enormous benefit of providing services in an overlay network 100 is that the network elements sitting in between the user facing elements and the service facing elements do not have to be involved in the delivery of network level services. The entire responsibility of providing the service now rests with network element serving the user location and the network element serving the service location. As used herein the network element serving the user location is referred to as an "edge router or "edge, wherein the network element serving the service location will be referred to as a "hub router" or "hub".

In one embodiment, the overlay controller may be provisioned with or at least have access to traffic policy functions. These traffic policy functions may be distributed to selected hubs and edges and may be used to direct traffic. In one embodiment, the use of labels that identify services and provide for a forwarding tag, allows the overlay network 100 to overcome all of the previously presented challenges. Labels that represent Virtual Private Networks (VPN) may be combined, in some embodiments, with the Service labels to provide services that are VPN-specific and are reached using VPN-specific policies, versus general overlay network policies for reaching a service identified solely by a service label applicable to the entire overlay network.

In each of the locations where a network level service is being provided, which technically could be either an Edge or a Hub location but for the sake of simplicity in the examples are presented as Hub sites, the Hub router is configured with information on which service it is providing and how to reach from a locally configured interface. The hub router will advertise this service using a label that identifies the type of service and how edge routers, by prepending the same label to packets being sent out from their sites, can reach the service. The next-hop address that the hub router uses to connect with the underlying network is also used as the means of actually getting to the same hub site across the intermediate network. This is how an edge router forwarding traffic into the overlay network determines which tunnel to use to reach the intended destination.

Services that may exist and provided at the network level include, but are not limited to, the following:

Firewall services
Intrusion Detection services
Traffic scrubbing services
Traffic sampling and analytical services
Caching
Deep Packet Inspection
Internet Service Based on the advertisements of routes from each edge and hub router and the advertisements of service labels from each hub router hosting a service, potentially restricted on a per-VPN basis by associating a service-label with a VPN-label, the overlay controller 102 constructs policies that are subsequently distributed to the network elements (hubs and edges) involved. The set of policies and their required contents are related to the exact nature of the service chain that is being constructed. Two examples are provided below.

Example 1: Simple Service-Chain with Only a Single Service

Figure 4:
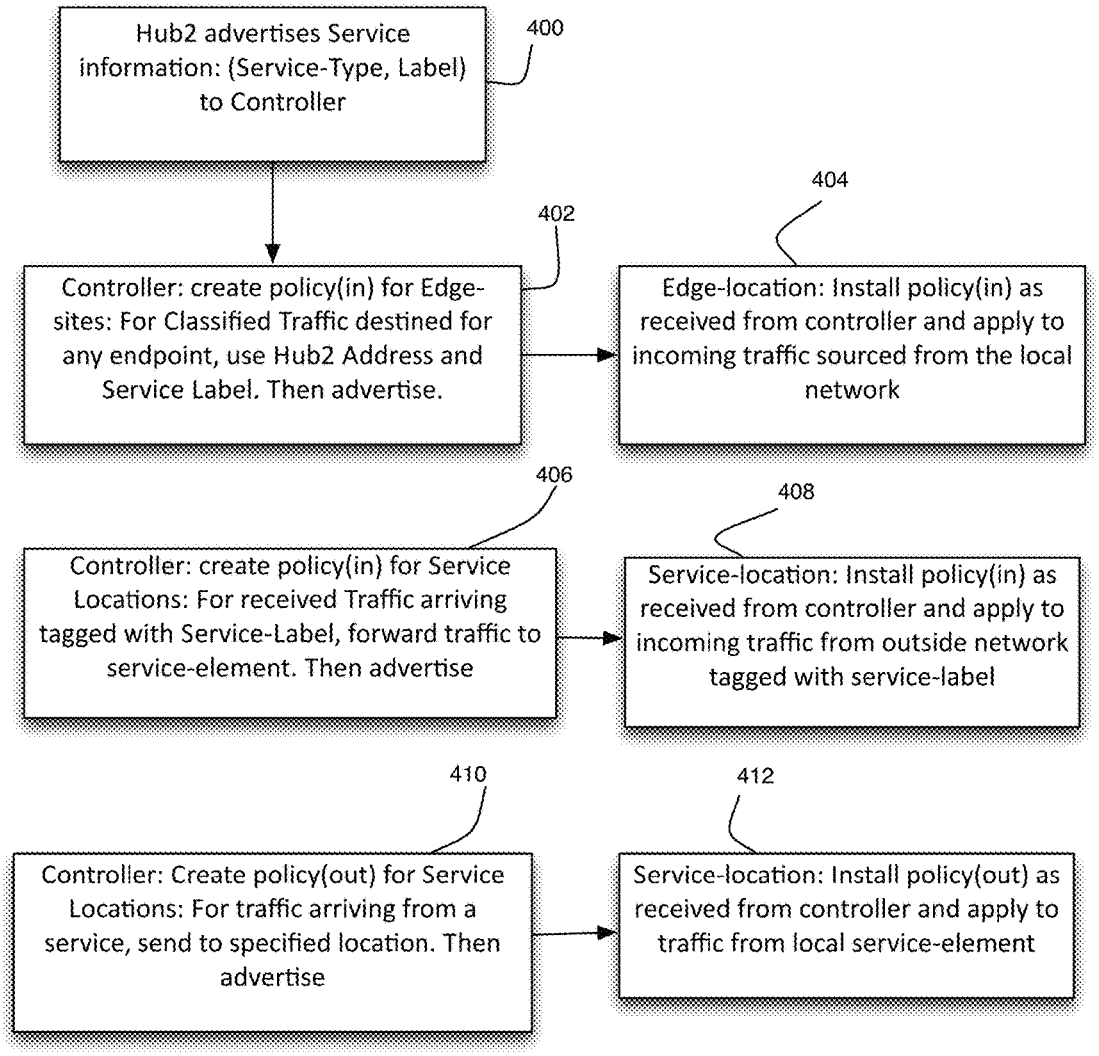
FIGS. 4-5 show examples of service chains, in accordance with one embodiment of the invention.

The setup for this service and network infrastructure is the following:

A router in a hub location, Hub2 advertises a service with a Label of 1 and a Service-type of Firewall (see FIG. 1). The steps in creating the service chain are shown in FIG. 4.

The network administrator decides that all traffic going to and from the Internet must pass through the firewall service The Internet entry and exit point is through a hub router referred to as Hub3, which could be advertised as a service but not in this example, for reasons of simplicity.

Each Edge location is equipped with the necessary routing information required to determine if traffic must be sent to the Internet or not.

The setup and distribution of policies will take place as follows:

Block 400: Hub2 advertises Service information: (Service-Type, Label) to the controller 102.

Block 402: The overlay controller 102 constructs the set of required policies and distributes them accordingly. This means that each node involved will be assigned a policy for managing the required traffic flow.

Block 404: Every Edge-router receives an outbound policy (for traffic towards the Internet) stipulating that all the traffic matching the routes received from Hub3, will be encapsulated in a packet with a Service-label of 1, matching the Firewall Service, and a next-hop address of Hub2. This will ensure all traffic destined for the Internet is using the tunnel from the Edge-router to Hub2

Block 406: The controller 102 creates a policy (in) for Service Locations: For received Traffic arriving tagged with Service-Label, forward traffic to service-element and advertises the policy thus created to each hub.

Block 408: Hub2 receives an inbound policy (for traffic received on its external interface), stipulating that all received traffic matching Service Label 1 is sent to the firewall. Exactly how the traffic is forwarded is a local decision.

Block 410: Hub2 receives an outbound policy (for traffic received from the Firewall) stipulating that the traffic destined for the Internet must be encapsulated with a next-hop address of Hub3, taking the traffic to the Internet. Any traffic destined for an Edge-router in the overlay network is sent with an encapsulation of that Edge-routers next-hop address Block 412: Hub3 receives an inbound policy (for traffic received from the Internet) stipulating that all traffic matching a destination advertised from an Edge-router is encapsulated in a packet with a Service-label of 1, matching the Firewall Service, and a next-hop address of Hub2

Example 2: Two Services are Chained Together

Using the same setup as in the prior example, but adding that all traffic returning from the Internet must not only pass through the Firewall Service, but also pass through an Intrusion Detection Service, the modification required to the infrastructure is the following:

Hub1 hosts the Intrusion Detection service and advertises a service with a Label of 2 and a Service-type of Intrusion Detection.

The changes in setup and distribution of policies is following:

Hub2, hosting the firewall service, has one addition to its outbound policy. All traffic destined for any Edge-router in the overlay network must be encapsulated with a Service-label of 2 and a next-hop address of Hub1.

Figure 5:
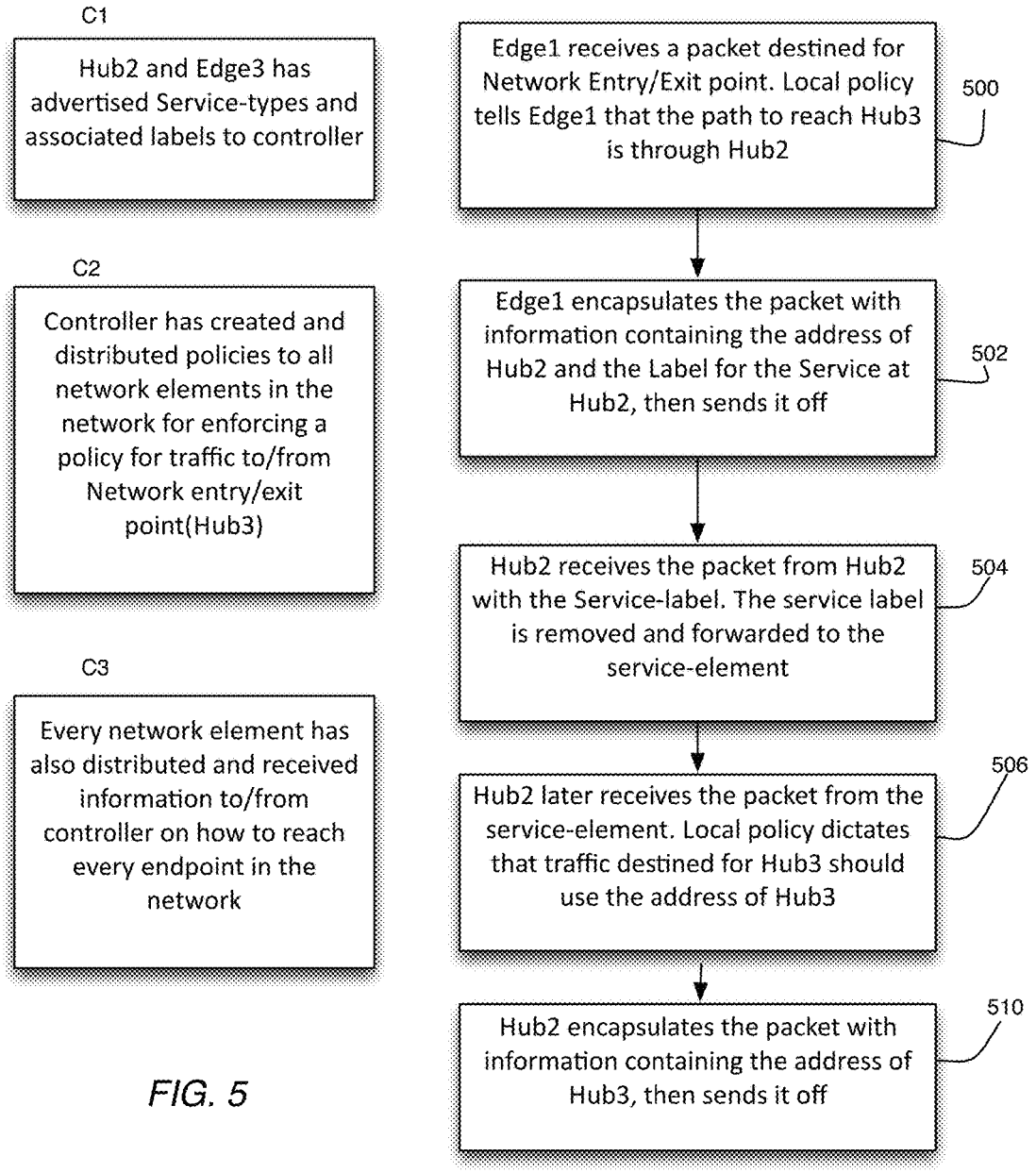

Hub1 is equipped with policies identical to what Hub2 had in the previous example, with the differences being that the label matching is done on Service-label 2 for inbound traffic. FIG. 5 shows a flowchart corresponding to this example of service chaining. Referring the FIG. 5, C1 to C3 are conditions and the processing blocks are as provided below:

Block 500: Edge1 receives a packet destined for Network Entry/Exit point. Local policy tells Edge1 that the path to reach Hub3 is through Hub2

Block 502: Edge1 encapsulates the packet with information containing the address of Hub2 and the Label for the Service at Hub2, then sends it off.

Block 504: Hub2 receives the packet from Hub2 with the Service-label. The service label is removed and forwarded to the service-element.

Block 506 Hub2 later receives the packet from the service-element. Local policy dictates that traffic destined for Hub3 should use the address of Hub3.

Block 508 Hub2 encapsulates the packet with information containing the address of Hub3, then sends it off.

Delivering on Other Requirements

The list of requirements presented earlier had several attributes that were not covered in the previous examples. The facilities used to deliver on those requirements are all present in this architecture and are used in the following ways to ensure that all requirements can be met For purposes of clarity, the control plane protocol used in this architecture is designed to distribute routing information, policy information and labels. By overloading the labels with inherent representations of services, information on services can be distributed without any modifications to the protocol itself.

The rerouting and reshuffling of traffic and control information is avoided entirely by making this service-chaining architecture policy driven and decoupled from the underlying forwarding plane represented by the intermediate underlying network.

By adding VPN-designations to the service attachments points, services can be delivered on a per-VPN basis. This requires the use of a label-stack where one label represent the VPN and another label represents the service. Alternatively, and at a higher administrative cost, service-labels can be assigned in VPN-specific ranges to avoid the use of a label-stack.

If traffic-load distribution is desired, then multiple service-locations can advertise the same service-type using identical labels, which would allow for each ingress Edge-router to distribute load across the set of service-sites based on some condition that is inherently defined or decided by policy.

Associating services with Service-type designators and associating them with the external addresses of Hub-locations, provides inherent location and service-availability awareness. This could be further augmented by geo-location information or other more specific location-related attributes.

Establishment of a Service Chain

Figure 3:
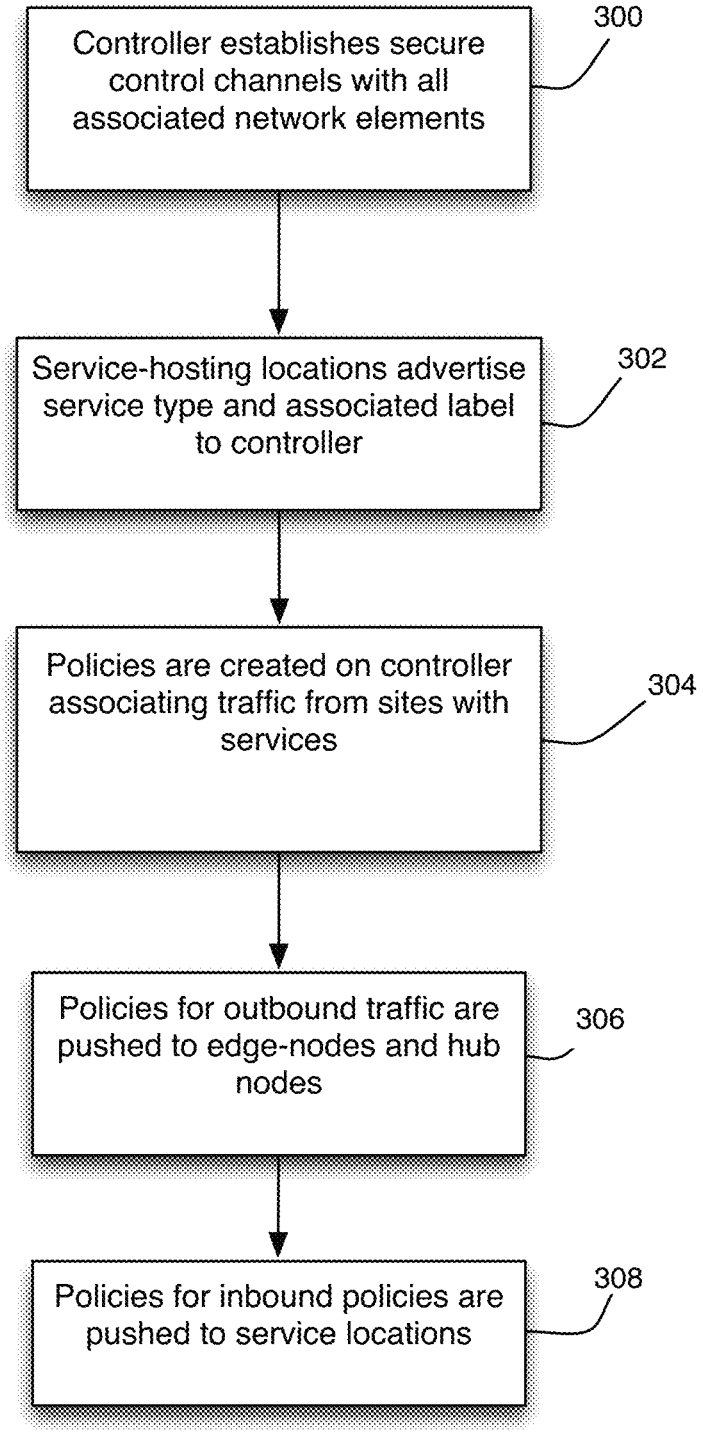
FIG. 3 shows a flowchart of operation for constructing a service chain, in accordance with one embodiment of the invention.

In one embodiment, to a method for establishing a service chain is shown in FIG. 3. Referring to FIG. 3, the method includes the following blocks:

Block 300: The overlay controller 102 establishes secure control channel with all associated network elements (hubs and edges).

Block 302: The service-hosting locations (hubs) advertise their service type and associated label to the overlay controller 102.

Block 304: The overlay controller 102 uses the service information received when constructing policies for the edge routers that are to use them.

The central controller can either:

Apply the service policy to overlay routes before sending those to edge nodes with overlay next hop and label changed to that of service.

Block 306: The central controller pushes the service policies to the edge routers. These policies link traffic to the ultimate destination with a service chain.

Block 308: The central controller can also push policies to the service hosting routers, instructing them of their role in a given service chain and how to forward inbound and outbound traffic related to each VPN and each Service.

Policy Construction and Information Distribution

In one embodiment, the controller 102 has the option of building a policy involving a service chain in two different ways:

1) The services along with the policies are both advertised to the edge routers that are to use them.

2) Services are advertised service nodes to the controller. Controller then uses the policy to resolve the overlay routes over service routes. It then advertises the resolved overlay routes to those edge nodes that are provisioned to receive those routes.

In the first option, policies can be implemented that takes the availability, capacity, latency, location and other aspects of the service chain into account and gives each edge router the awareness to select the most optimal service chain. In the second option, the edge routers are kept unaware of that they are using a service chain and simply operate based on the information they have been provided for the purpose of forwarding traffic.

Service Identification

In one embodiment, a service route, service label, service identifier and transport location (TLOC) identify each service. Specific service chains are established by policy and do not require any additional information to be distributed for traffic to flow along the path instantiated by the creation of the service chain. The Service Route is distributed for identification purposes only and is not used for forwarding.\

Traffic Forwarding in the Service Chain

In one embodiment, each edge node uses existing destination routes that are given a next-hop TLOC pointing to the entry point of a service chain. This route to TLOC assignment can be done by the central controller as a way of enforcing central service-chain policy, or by edge router when enforcing policies either distributed by the central controller or created locally on the device.

In one embodiment, each service router in the path of a service chain accepts inbound traffic based on the destination TLOC and VPN Label in the received packet and forwards it out the associated interface for the specific service being associated with the TLOC/Label combination. In the outbound direction, each service router must be equipped with policy describing what the next hop is for the particular destination. This allows for each service router to support multiple service chains and different policies for each direction of traffic. Since the outgoing direction is controlled by policy, this allows for great flexibility in choosing the next point in the service chain based on individually defined criteria for that service chain, service, or service router.

The service chaining architecture and method described above provides the following benefits:

Bidirectional Service Chains:

The service chaining architecture provides for the ability to create both unidirectional and bi-directional service chains simply by means of policy with no requirement to advertise additional routing information or labels.

Service Chain Eligibility:

The service chaining architecture is inherently aware of which services are present in a fully functional service chain. This awareness allows for the ability to qualify the eligibility of each specific service chain as the nature of each chain might change during the course of providing service. If crucial service may fail then the service chain could be taken out of service whereas the failure of non-crucial service could render the chain to operate either uninterrupted or with lower priority versus other available chains.

Service-Type Awareness:

The service type is included in the advertisements from each service location and allows for each hop in a service chain, inclusive of ingress and egress points, to make decisions of which specific instance of a given service-type to use. Deciding factors can include capacity, location, current load and other influential characteristics.

Service any Casting:

Each hop in a service chain is equipped to make decisions of which instance of a given service to use at any time. This is strongly linked to the service-type awareness claim but does not have to be. Redundancy through any casting can also be linked to capacity, location, current load and other influential factors aside from service-type.

Primary and Backup Service Locations:

Policies pushed by the central controller can be used to dictate primary and secondary, or backup, locations where a given service is being provided. This further extends the Service-type awareness function described above. The switch from a primary to a backup service can be decided upon and pushed by the central controller, or through previously defined and pushed policy, take place at the edge router upon detection of pre-defined failure conditions.

Equal and Unequal Cost Load-Balancing:

Centrally defined and pushed policies can also influence how traffic is distributed across multiple sites providing the same service for the purpose of explicitly equal cost load-balancing, or if desired, using weights to achieve unequal cost load-balancing.

Centrally defined and pushed policies can also influence how traffic is distributed across multiple sites providing the same service for the purpose of explicitly equal cost load-balancing, or if desired, using weights to achieve unequal cost load-balancing.

Centrally Administered and Provisioned Service Chains:

The service chaining concept described has the distinct advantage that the entire function can be provisioned from a central controller location without having to perform and specific per edge-node configuration or provisioning. As soon as the policy creation is complete on the central controller and services have been made available and linked with the defined policies, edge-nodes that are to use a defined service chain are triggered to do so by the central controller. For convergence between service locations, changes in current service chain or service site affiliation, or service chain eligibility, decisions and changes can be taken and executed upon by the central controller, the edge node, or both. How these actions are performed depend on how the policies were constructed at the central controller. This claim however, does not limit the provisioning or operation of a service chain that is partially performed by the central controller and augmented by service routers or edge routers.

Figure 6:
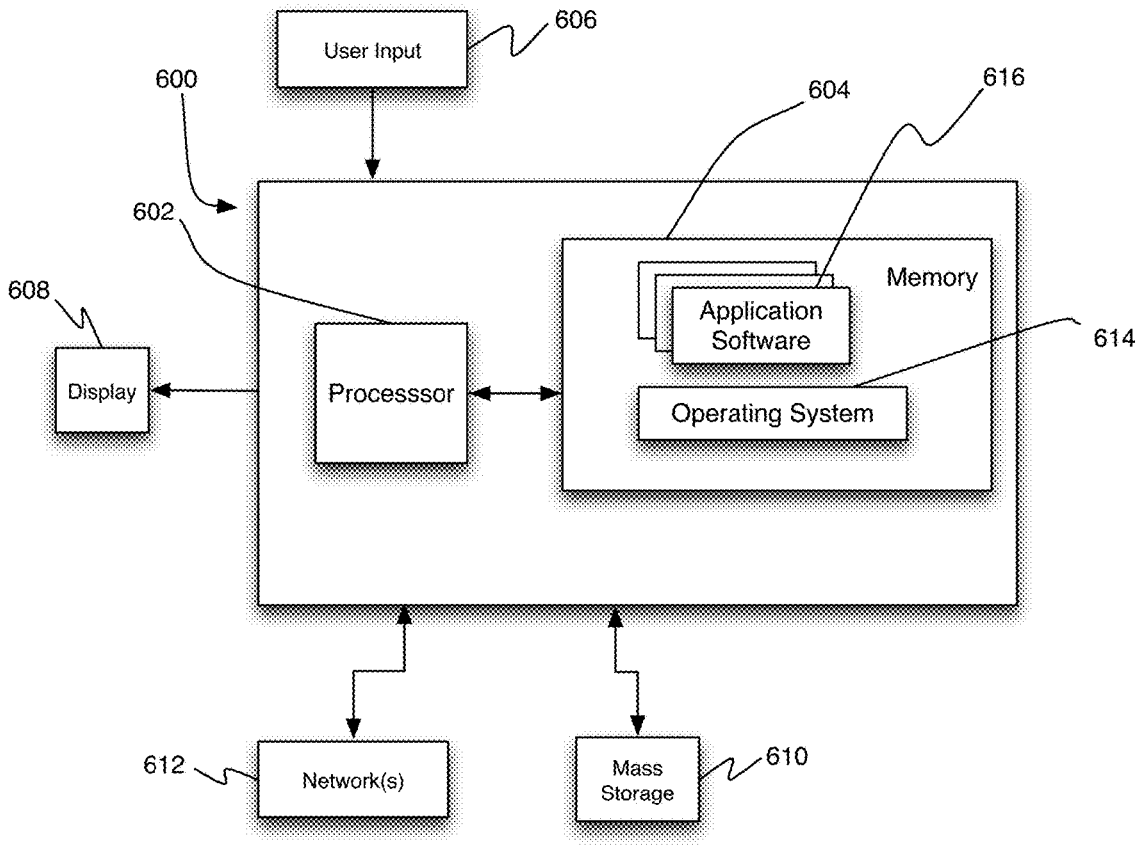
FIG. 6 shows a high-level block diagram for an overlay controller, in accordance with one embodiment of the invention.

FIG. 6 shows an example of hardware 600 that may be used to implement the overlay controller 102, in accordance with one embodiment. The hardware 600 may includes at least one processor 602 coupled to a memory 604. The processor 603 may represent one or more processors (e.g., microprocessors), and the memory 604 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware, e.g. any cache memory in the processor 602, as well as any storage capacity used as a virtual memory, e.g., as stored on a mass storage device.

The hardware also typically receives a number of inputs and outputs for communicating information externally. For interface with a user or operator, the hardware may include one or more user input output devices 606 (e.g., a keyboard, mouse, etc.) and a display 608. For additional storage, the hardware 600 may also include one or more mass storage devices 610, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 612 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 612 and each of the components, as is well known in the art.

The hardware 600 operates under the control of an operating system 614, and executes application software 616 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 7:
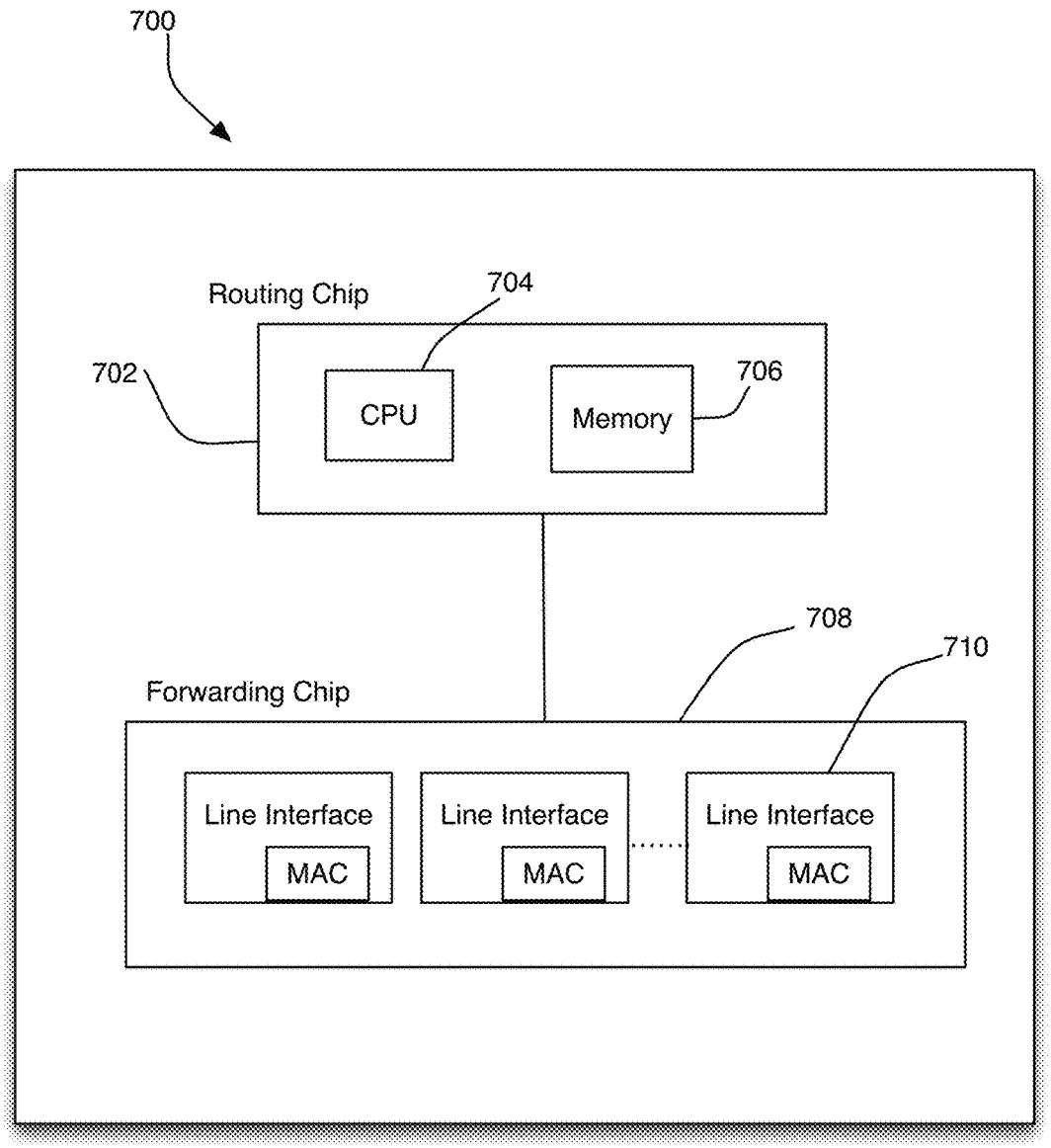
FIG. 7 shows a high-level block diagram of hardware for a router, in accordance with one embodiment of the invention.

FIG. 7 shows a block diagram of hardware 700 for edge routers and hubs describe above, in accordance with one embodiment of the invention. Referring to FIG. 7, the hardware 700 includes a routing chip 704 coupled to a forwarding chip 708. The routing chip 704 performs functions such as path computations, routing table maintenance, and reachability propagation. Components of the routing chip include a CPU or processor 704, which is coupled to a memory 706. The memory stores instructions to perform the methods disclosed herein. The forwarding chip is responsible for packet forwarding along a plurality of line interfaces 710.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for routing, comprising:

establishing an overlay network, comprising a plurality of network elements and an overlay controller, wherein the overlay controller is in communication with each network element via a secure tunnel established through an underlying transport network;

receiving, by the overlay controller, a first message from a first network element of the plurality of network elements, wherein the first message identifies a first service [hosted at] *available through* the first network element and a first label associated with the first service;

receiving, by the overlay controller, a second message from a second network element of the plurality of network elements, wherein the second message identifies a second service [hosted at] *available through* the second network element and a second label associated with the second service;

constructing, by the overlay controller, a policy defining a service chain that links the first service and the second service; and

[pushing] *distributing*, by the overlay controller, the policy to a site so that traffic from the site including the first label is routed using the underlying transport network to the first network element [hosting the first service] and subsequently to the second network element[hosting the second service].

2. The method of claim 1, wherein the [pushing] *distributing* comprises:

in response to the policy *also* defining flow of outbound traffic, [pushing] *distributing* the policy created on the overlay controller to the plurality of network elements [characterized as being one of] *including* an edge router and a hub router.

3. The method of claim 1, wherein the [pushing] *distributing* comprises:

in response to the policy *also* defining flow of inbound traffic, [pushing] *distributing* the policy created on the overlay controller to the first network element.

4. The method of claim 1, wherein the [pushing] *distributing* comprises applying the policy to an overlay route prior to sending the overlay route to a third network element of the plurality of network elements, wherein the third network element is associated with an overlay next hop that refers to the first network element and traffic at the third network elements is associated with the first label.

5. A non-transitory computer-readable medium having stored thereon, instructions which, when executed by a controller, cause the controller to perform or control performance of operations comprising:

establishing an overlay network, comprising a plurality of network elements and an overlay controller, wherein the overlay controller is in communication with each network element via a secure tunnel established through an underlying transport network;

receiving, by the overlay controller, a first message from a first network element of the plurality of network elements, wherein the first message identifies a first service [hosted at] *available through* the first network element and a first label associated with the first service;

receiving, by the overlay controller, a second message from a second network element of the plurality of network elements, wherein the second message identifies a second service [hosted at] *available through* the second network element and a second label associated with the second service;

constructing, by the overlay controller, a policy defining a service chain that links the first service and the second service; and

[pushing] *distributing*, by the overlay controller, the policy to a site so that traffic from the site including the first label is routed using the underlying transport network to the first network element [hosting the first service] and subsequently to the second network[element hosting the second service].

6. The non-transitory computer-readable medium of claim 5, wherein the [pushing] *distributing* comprises:

in response to the policy *also* defining flow of outbound traffic, [pushing] *distributing* the policy created on the overlay controller to the plurality of network elements [characterized as being one of] *including* an edge router and a hub router.

7. The non-transitory computer-readable medium of claim 5, wherein the [pushing] *distributing* comprises:

in response to the policy *also* defining flow of inbound traffic, [pushing] *distributing* the policy created on the overlay controller to the first network element.

8. The non-transitory computer-readable medium of claim 5, wherein the [pushing] *distributing* comprises applying the policy to an overlay route prior to sending the overlay route to a third network element of the plurality of network elements, wherein the third network element is associated with an overlay next hop that refers to the first network element and traffic at the third network elements is associated with the first label.

9. An overlay controller, comprising:

a processor; and a memory coupled to the processor, the memory storing instructions which when executed by the processor causes the overlay controller to perform or control performance of operations, comprising:

establishing an overlay network, comprising a plurality of network elements and an overlay controller, wherein the overlay controller is in communication with each network element via a secure tunnel established through an underlying transport network;

receiving, by the overlay controller, a first message from a first network element of the plurality of network elements, wherein the first message identifies a first service [hosted at] *available through* the first network element and a first label associated with the first service;

receiving, by the overlay controller, a second message from a second network element of the plurality of network elements, wherein the second message identifies a second service [hosted at] *available through* the second network element and a second label associated with the second service;

constructing, by the overlay controller, a policy defining a service chain that links the first service and the second service; and

[pushing] *distributing*, by the overlay controller, the at least one policy to a site so that traffic from the site including the first label is routed using the underlying transport network to the first network element [hosting the first service] and subsequently to the second network element[hosting the second service].

10. The overlay controller of claim 9, wherein the [pushing] *distributing* comprises:

in response to the policy *also* defining flow of outbound traffic, [pushing] *distributing* the policy created on the overlay controller to the plurality of network elements [characterized as being one of] *including* an edge router and a hub router.

11. The overlay controller of claim 9, wherein the [pushing] *distributing* comprises:

in response to the policy *also* defining flow of inbound traffic, [pushing] *distributing* the policy created on the overlay controller to the first network element.

12. The overlay controller of claim 9, wherein the [pushing] *distributing* comprises applying the policy to an overlay route prior to sending the overlay route to a third network element of the plurality of network elements, wherein the third network element is associated with an overlay next hop that refers to the first network element and traffic at the third network elements is associated with the first label.

13. The method of claim 1, wherein packets of the traffic from the site include a stack of labels, including the first label and a third label identifying a virtual private network (VPN).

14. The non-transitory computer-readable medium of claim 5, wherein packets of the traffic from the site include a stack of labels, including the first label and a third label identifying a virtual private network (VPN).

15. The overlay controller of claim 9, wherein packets of the traffic from the site include a stack of labels, including the first label and a third label identifying a virtual private network (VPN).

16. The overlay controller of claim 9, wherein the first message indicates that the first service is associated with a particular virtual private network (VPN).

17. The overlay controller of claim 16, wherein the policy instructs the site to insert the first label into data packets that are sent through the particular VPN and forgo insertion of the first label into data packets that are sent outside the particular VPN.

18. The overlay controller of claim 16, wherein the second message indicates that the second service is associated with the particular VPN.

*19. A method for forwarding network traffic to a network service in an overlay network, the method comprising:*

*establishing an overlay network, comprising a plurality of network devices and an overlay controller, wherein the overlay controller is in communication with one or more of the network devices via a communications channel established through an underlying transport network, wherein at least a plurality of the network devices are overlay network devices, each overlay network device operative to establish a network layer tunnel with at least one other overlay network device of the overlay network;*

*receiving, by the overlay controller, a first message from at least one of the plurality of network devices, the first message relating to a network service available through a first overlay network device of the overlay network, the first message comprising a first identifier associated with the network service;*

*receiving, by the overlay controller, a second message from at least one of the plurality of network devices, the second message identifies a user service available through a first network device and including a second identifier associated with the user service;*

*constructing based on at least a portion of the first and second message, one or more policies;*

*distributing the one or more policies to one or more of the overlay network devices of the overlay network,*

*at least one of the one or more policies defining a service chain and linking the network service to the user service, the policy operative to cause one or more of the overlay network devices of the overlay network to forward, over a corresponding network layer tunnel, network traffic associated with one or more services and matching an attribute to the first overlay network device;*

*wherein the first overlay network device is operative to provide the network traffic to the first network service, and subsequently forward the network traffic received from the network service to the first network device.*

*20. The method of claim 19, wherein the network service is any one of a service in the group consisting of firewall services, intrusion detection services, traffic scrubbing services, caching services, traffic sampling and analytical services, deep packet inspection services, and internet services.*

*21. The method of claim 19, wherein the user service is accessible through a browser.*

*22. The method of claim 19, further comprising*

*receiving, by the overlay controller, a first message from the first overlay network device, wherein the first message identifies the network service available through the first overlay network device.*

*23. The method of claim 19, wherein each overlay network device is operative to establish a secure network layer tunnel with at least one other overlay network device of the overlay network.*

*24. The method of claim 19, wherein at least one of the plurality of overlay network devices is a hub network device, and at least another one of the plurality of overlay network devices is an edge network device.*

*25. The method of claim 19, wherein at least a second one of the one or more policies is operative to cause the first overlay network device to forward, over a corresponding network layer tunnel, the network traffic associated with the user service and matching the attribute to a second overlay network device.*

*26. The method of claim 19, wherein the communications channels between the overlay controller and the overlay network devices are secure communications channels.*

*27. The method of claim 19, wherein the communications channels between the overlay controller and the overlay network devices are secure tunnel connections.*

*28. An overlay network controller, comprising:*

*a processor;*

*a memory coupled to the processor, the memory storing instructions which when executed by the processor causes the controller to:*

*establish an overlay network; comprising a plurality of overlay network devices and the overlay controller;*

*communicate with each overlay network device via a communications channel established through an underlying transport network;*

*facilitate the establishment by each overlay network device of a network layer tunnel with at least one other overlay network device of the overlay network;*

*access a first message defining a network service available through a first overlay network device of the overlay network, wherein the first message comprising a first identifier associated with the network service;*

*access a second message identifying a user service available through a first network device and including a second identifier associated with the user service;*

*construct one or more policies and distribute the one or more policies to one or more of the overlay network devices of the overlay network,*

*at least one of the one or more policies defining a service chain and linking the network service to the user service, the policy operative to cause one or more of the overlay network devices of the overlay network to forward, over a corresponding network layer tunnel, network traffic associated with the user service and matching an attribute to the first overlay network device;*

*wherein the first overlay network device is operative to provide the network traffic to the network service, and subsequently forward the network traffic received from the network service to the first network device.*

*29. The overlay network controller of claim 28, wherein the network service is any one of a service in the group consisting of firewall services, intrusion detection services, traffic scrubbing services, caching services, traffic sampling and analytical services, deep packet inspection services, and internet services.*

*30. The overlay network controller of claim 28, wherein the user service is accessible through a browser.*

*31. The overlay network controller of claim 28, wherein the instructions which when executed by the processor causes the controller to receive the first message from the first overlay network device, wherein the first message identifies the network service available through the first overlay network device.*

*32. The overlay network controller of claim 28, wherein each overlay network device establishes a secure network layer tunnel with at least one other overlay network device of the overlay network.*

*33. The overlay network controller of claim 28, wherein at least one of the plurality of overlay network devices is a hub network device, and at least another one of the plurality of overlay network devices is an edge network device.*

*34. The overlay network controller of claim 28, wherein at least a second one of the one or more policies is operative to cause the first overlay network device to forward, over a corresponding network layer tunnel, the network traffic associated with the user service and matching the attribute to a second overlay network device.*

*35. The overlay network controller of claim 28, wherein the communications channels between the overlay controller and the overlay network devices are secure communications channels.*

*36. The overlay network controller of claim 28, wherein the communications channels between the overlay controller and the overlay network devices are secure tunnel connections.*

*37. A system for forwarding network traffic to a network service in an overlay network, the system comprising:*

*a controller and a plurality of overlay network devices, the plurality of overlay network devices each operative to establish a network layer tunnel with at least one other overlay network device of the plurality of overlay network devices;*

*the controller comprising:*

*a processor;*

*a memory coupled to the processor, the memory storing instructions which when executed by the processor causes the controller to:*

*establish an overlay network comprising the plurality of overlay network devices and an overlay controller, wherein the overlay controller commu-*

*nicates with each overlay network device via a communications channel established through an underlying transport network,*

*access a first message defining the network service available through a first overlay network device of the overlay network, the first message comprising a first identifier associated with the network service;*

*access a second message identifying to a user service available through a first network device and including a second identifier associated with the user service;*

*construct one or more policies and distribute the one or more policies to one or more of the overlay network devices of the overlay network,*

*at least one of the one or more policies defining a service chain and linking the network service to the user service, the policy operative to cause one or more of the overlay network devices of the overlay network to forward, over a corresponding network layer tunnel, network traffic associated with the user service and matching an attribute to the first overlay network device;*

*wherein the first overlay network device is operative to provide the network traffic to the network service, and subsequently forward the network traffic received from the network service to a second network device having reachability to the first network device.*

*38. The system of claim 37, wherein the network service is any one of a service in the group consisting of firewall services, intrusion detection services, traffic scrubbing services, caching services, traffic sampling and analytical services, deep packet inspection services, and internet services.*

*39. The system of claim 37, wherein the user service is accessible through a browser.*

*40. The system of claim 37, wherein the instructions which when executed by the processor causes the controller to receive a first message from the first overlay network device, wherein the first message identifies the network service available through the first overlay network device.*

*41. The system of claim 37, wherein each overlay network device is operative to establish a secure network layer tunnel with at least one other overlay network device of the overlay network.*

*42. The system of claim 37, wherein at least one of the plurality of overlay network devices is a hub network device, and at least another one of the plurality of overlay network devices is an edge network device.*

*43. The system of claim 37, wherein at least a second one of the one or more policies is operative to cause the first overlay network device to forward, over a corresponding network layer tunnel, the network traffic associated with the user service and matching the attribute to a second overlay network device.*

*44. The system of claim 37, wherein the communications channels between the overlay controller and the overlay network devices are secure communications channels.*

*45. The system of claim 37, wherein the communications channels between the overlay controller and the overlay network devices are secure tunnel connections.*

* * * * *